June 5, 1923.
H. C. RAYMOND
VEHICLE SIGNAL
Filed Sept. 26, 1921
1,457,460
2 Sheets-Sheet 1
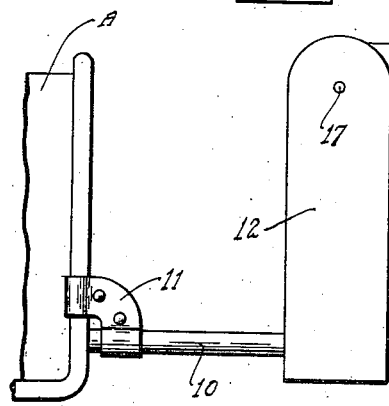
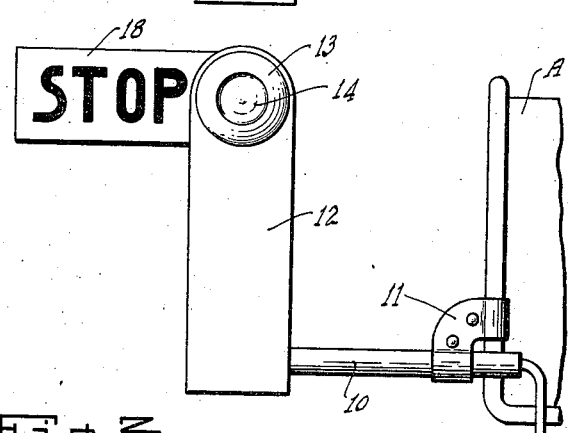
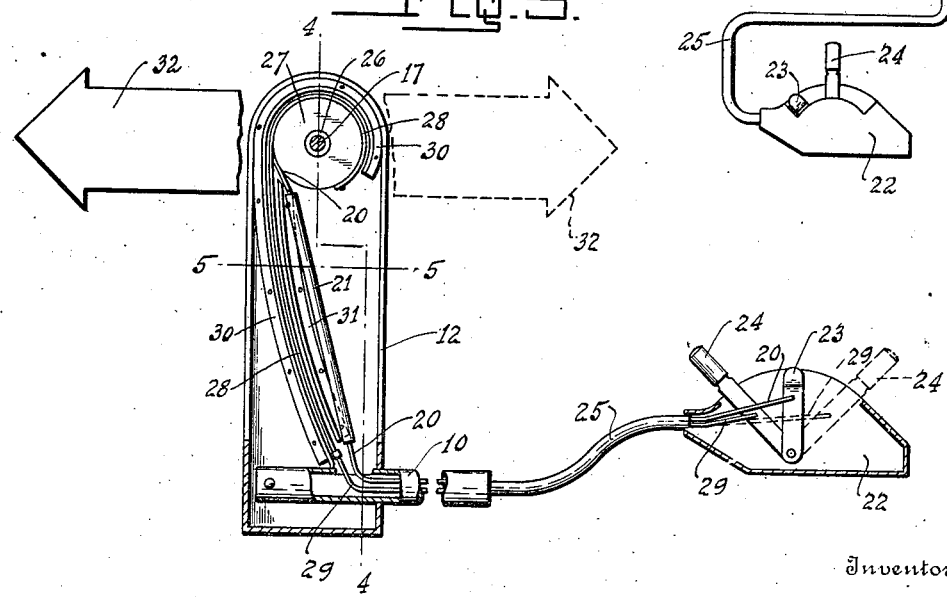
Inventor
Harry C. Raymond
By Watson E. Coleman Attorney

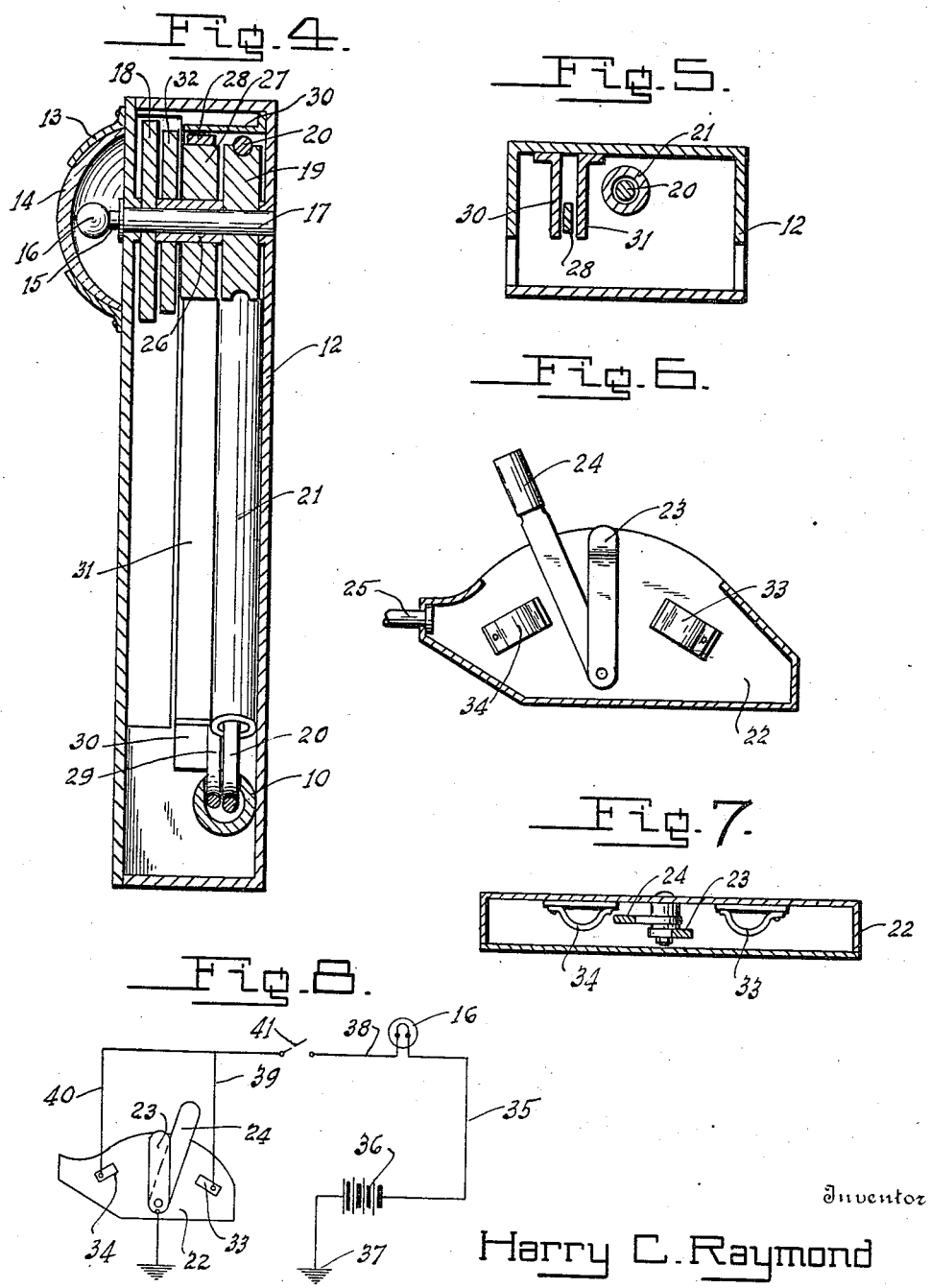

Patented June 5, 1923.

1,457,460

UNITED STATES PATENT OFFICE.

HARRY C. RAYMOND, OF SALT LAKE CITY, UTAH.

VEHICLE SIGNAL.

Application filed September 26, 1921. Serial No. 503,325.

*To all whom it may concern:*

Be it known that I, HARRY C. RAYMOND, a citizen of the United States, residing at Salt Lake City, in the county of Salt Lake and State of Utah, have invented certain new and useful Improvements in Vehicle Signals, of which the following is a specification, reference being had to the accompanying drawings.

This invention relates to signalling devices, particularly to traffic signals, and has for its object the provision of a device designed to be mounted upon some convenient location, preferably the windshield of an automobile or other vehicle and provided with movable signal blades whereby to apprise the drivers of following and approaching traffic of any contemplated change in the direction of travel of the vehicle equipped with the device, or a contemplated stop.

An important object is the provision of a device of this character which is provided with means whereby the signal blade, whichever is moved, will be illuminated automatically when in signalling position, the illuminating means rendering the device effective for use by night as well as by day.

A more specific object is the provision of a signalling device in which only two signal blades are necessary, one being capable of being swung in opposite directions to indicate a contemplated turn to either the right or left, the mechanism being of such construction that either a pushing or pulling action may be exerted upon this signal element.

Another object is the provision of a device of this character which is incased so that it will be protected against injury from inclement weather and also from tampering.

An additional object is the provision of a device of this character which will be simple and inexpensive in manufacture, easy to install, efficient in operation, positive in action, durable in service and a general improvement in the art.

With the above and other objects and advantages in view, the invention consists in the details of construction to be hereinafter more fully described and claimed, and illustrated in the accompanying drawings, in which:

Figure 1 is an elevation showing my device associated with the windshield of an automobile viewed from the front of the vehicle;

Figure 2 is a similar view looking at the device from the rear;

Figure 3 is a vertical sectional view showing the indicating arrow pointing to the left in full lines and pointing to the right in dotted lines;

Figure 4 is a sectional view on the line 4—4 of Figure 3;

Figure 5 is a detail view of the switch device showing the circuit controlling mechanism;

Figure 6 is a horizontal section through the switch and control mechanism; and

Figure 7 is a diagram of the electric circuit.

Figure 8 is a diagrammatic view showing the wiring circuit employed.

Referring more particularly to the drawings, I have shown my device as associated with the windshield A of an automobile, though it should be distinctly understood in advance that if preferred the mechanism might be located at some other point, depending upon the style, make and construction of the vehicle with which the device is associated.

In carrying out my invention I provide a tubular support 10 which is provided with a suitable clamp 11 whereby it may be rigidly secured upon the windshield frame or other location, it being understood that this clamp might be formed in a wide variety of ways depending upon the specific element to which it is to be attached. Carried by the outer end of the tubular support is an upright casing 12 upon the rear side of which is mounted a pressed metal frame 13 carrying a colored glass pane or lens 14 which, of course, would be whatever color is required by law in the particular locality in which the device is used. Located within the frame 13 is a socket 15 holding an incandescent bulb 16. The means for energizing this bulb will be hereinafter explained. Journaled through the upper portion of the casing is a shaft 17 upon which is secured a signal blade 18 bearing on one side, the front, the legend "Pass" and bearing upon its rear side the legend "Stop." Ordinarily the blade 18 is contained within the casing which is of course provided in one side with a suitable slot permitting the passage of the blade from one position to the other. Secured upon the shaft 17 is a disk 19 to which is secured one end of a suitable length of piano wire 20 which leads through a tubular guide 21 in the casing and which extends through and beyond the tubular support 10.

Mounted at some convenient location within reach of the operator of the vehicle is a control device which comprises a casing 22 having a slotted top and within which are pivoted control levers 23 and 24. Leading from this casing 22 to the tubular support 10 is a flexible housing 25 through which the piano wire 20 extends so that the wire may be connected with the lever 23.

Rotatable upon the shaft 17 is a hollow shaft 26 formed upon or rigidly secured to a disk 27 to which is secured one end of a flat steel spring 28 which is of spiral formation similar to a clock spring and this spring is trained about the disk 27 throughout the major portion of a single convolution. Welded to the free end of this spring is a length of piano wire 29 which leads into and through the tubular support 10 and through the flexible housing 25 and which is connected with the control lever 24. Secured upon one wall of the casing 12 is an involute guide strip 30 which extends from the point of entrance of the wire 29 into the support 10 upwardly and around the major portion of the disk 27 in spaced relation to the latter. Also secured to this same wall of the casing is a curved strip 31 which extends at its lower end from a point adjacent the lower end of the strip 30 to a point adjacent the periphery of the disk 27, the strips 30 and 31 cooperating to define a channel shaped guide for the spring 28 so that the latter will be prevented from buckling or having other undesired movement. Carried by the hollow shaft 26 is a signal element 32 which is formed in the shape of an arrow and which may be painted any desired color which will be conspicuous. Ordinarily this signal arrow is contained within the casing which is of course provided with a suitable slot for its passage.

Located against and insulated from one wall of the control casing 22 are contact strips 33 and 34 either of which is engageable by the levers 23 and 24 at the limits of their movement. It is of course conceivable that the means for energizing the incandescent bulb 16 might be arranged in quite a variety of forms though for the sake of illustration I have shown one terminal of the bulb 16 as connected by a wire 35 with one terminal of a suitable source of current 36 which may be the storage battery of the vehicle or which may be a separate battery of dry cells. The other terminal of the source of current is grounded, as indicated at 37, in the usual manner. Connected with the other terminal of the bulb 16 is a wire 38 which is connected with both of the contacts 33 and 34 by branched wires 39 and 40 respectively. It is of course to be understood that the conducting wires leading from the lamp or bulb to the control device pass through the tubular support 10. At this point it should be understood that the specific connection and grounding shown and described need not necessarily be followed, as an alternative arrangement might be equally satisfactory. In this particular arrangement it is of course seen that both of the levers 23 and 24 are mounted upon the control casing 22.

The operation of the device is as follows: Ordinarily, that is when the device is not in use, the arrow 32 and blade 18 are both concealed within the casing 12 and the levers 23 and 24 are in their neutral positions intermediate the ends of the casing 22 and of course out of engagement with the contacts 33 and 34. In case it is desired to signal an intention to stop, the operator grasps the lever 23 and pulls it in the proper direction, and it will be noted that the levers 23 and 24 are of different lengths so that there will be no confusion as to which one to operate to give the proper signal. When the lever 23 is pulled in one direction it applies a pull to the piano wire 20 which being connected with the disk 19 associated with the blade 18 causes rotation of the disk and consequently the blade so that the blade will be swung out of the casing 12 and will extend in a horizontal position as indicated in Figures 1 and 2. When this is done it will be observed that the legend " Stop " on the rear side of the blade will apprise the drivers of following vehicles the intention to stop, while the legend " Pass " on the front of the blade will signify to drivers of approaching vehicles that they may safely pass as no turn is contemplated. When the lever is thus moved it will of course engage the contact 33 which will close the circuit from the source of current 36 through the incandescent bulb 16 for energizing the bulb so that light will shine through the colored glass pane 14 and not only serve itself as a signal but also serve to illuminate the signal blade in order that the legend thereon may be easily read. It is of course unnecessary that the light be energized when the device is used in the day time and it is therefore preferable to provide a suitable switch conventionally illustrated at 41 interposed in one of the current carrying wires so that the current will be cut off in the day time. When it is desired to return the signal blade to its initial position the operator grasps the lever 23 and moves it in the opposite direction whereupon the stiffness of the piano wire will permit the disk 19 to be forced back to its original position, carrying with it the bolt 18.

When it is desired to signal an intention to turn to the left, the operator grasps the lever 24 and pushes it to the left whereupon the piano wire 29 will be moved longitudinally so as to cause corresponding movement of the spring 28 which being secured to and partially wrapped about the disk 27 will cause rotation of the latter and consequent swinging of the arrow 32 so that the latter will move out of the casing into a horizontally extending position pointing to the left. When this is done the lever 24 will be in engagement with the contact 34 and the circuit will be closed from the source of current through the bulb 16 for energizing the latter so that the light will be displayed. After the turn has been completed the operator returns the lever 24 to its initial intermediate position whereupon a corresponding pull on the wire 29 and spring 28 will return the arrow to its normal position within the casing.

When it is desired to indicate a turn to the right, the operator grasps the lever 24 and pulls it to the right whereupon the arrow 32 will be swung out of the casing and will be swung through an arc of 180° so that it will point to the right, as indicated in Figure 3. At the same time the lever 24 will engage the contact 33 and will close the circuit through the arm 16 for producing the proper illumination. To return the signal arrow 32 to normal position the lever 24 is simply moved to the left into its intermediate position.

From the foregoing description and a study of the drawings it will be apparent that I have thus provided a simply constructed and consequently inexpensive signal device for automobiles, trucks and in fact all vehicles whereby a positive signal may be given which will signify the driver's intentions regarding stops and turns so that the drivers of other vehicles as well as pedestrians and traffic officers will be apprised of the contemplated changes. Owing to the provision of the incandescent bulb and the automatic switch device for energizing the same when the signal is given, it will be apparent that the device is equally well adapted for use by night as by day. Owing to the comparative fewness of the parts it is apparent that there is little to get out of order and that the device should consequently have a long life and efficiently perform all the functions for which it is intended.

While I have shown and described the preferred embodiment of the invention, it is of course to be readily understood that I reserve the right to make such changes in the form, construction and arrangement of parts as will not depart from the spirit of the invention or the scope of the sub-joined claims.

Having thus described my invention, I claim:

1. A signal device of the character described comprising a tubular support, a casing carried by one end thereof, a shaft extending across the casing, a hollow shaft rotatable upon said shaft carrying a disk, a signal blade carried by the disk and normally disposed within the casing, a spring of convolute form having one end secured to and partially wrapped about said disk, a relatively stiff flexible member connected with the free end of said spring and trained through said tubular support, an involute strip secured within the casing and partially encircling the disk in spaced relation thereto, a second strip extending adjacent the periphery of the disk and cooperating with the first named strip to define a channel guide for said spring, and means for applying a push or pull to said flexible member.

2. A signal device of the character described comprising a tubular support, a casing carried by one end thereof, a shaft extending across the casing, a hollow shaft rotatable upon said shaft carrying a disk, a signal blade carried by the disk and normally disposed within the casing, a spring of convolute form having one end secured to and partially wrapped about said disk, a relatively stiff flexible member connected with the free end of said spring and trained through said tubular support, an involute strip secured within the casing and partially encircling the disk in spaced relation thereto, a second strip extending adjacent the periphery of the disk and cooperating with the first named strip to define a channel guide for said spring, and means for applying a push or pull to said flexible member, said means comprising a control casing located at a point remote from said first named casing, a flexible housing enclosing said flexible member, and connected with said tubular support and said control casing, and a lever pivoted within the control casing and connected with said flexible member.

In testimony whereof I hereunto affix my signature.

HARRY C. RAYMOND.